May 14, 1974  H. DENIS  3,810,790

METHOD OF EFFECTING ELECTRIC CONNECTION

Filed Feb. 17, 1972  2 Sheets-Sheet 1

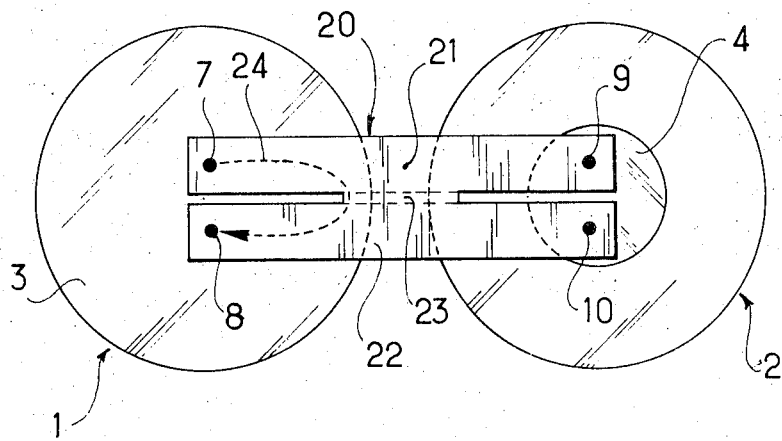

United States Patent Office 3,810,790
Patented May 14, 1974

3,810,790
METHOD OF EFFECTING ELECTRIC CONNECTION
Henri Denis, Saint-Brice-sous-Foret, France, assignor to Saft-Societe des Accumulateurs, Fixes et de Traction
Filed Feb. 17, 1972, Ser. No. 227,071
Claims priority, application France, Feb. 19, 1971, 7105770
Int. Cl. H01m 5/00
U.S. Cl. 136—134 P                                      2 Claims

ABSTRACT OF THE DISCLOSURE

Method for effecting electrical connection by electrical welding, according to which at least the portion of the connection to be welded to a part is in the form of two substantially paralled strips which are preferably close to each other and wherein each of the two electrodes of the welding apparatus is applied, during welding, respectively to one of said strips.

BRIEF SUMMARY OF INVENTION

The invention concerns the assembly with parts of electrical connections therefor by electric welding.

At present, for electrically connecting two electrochemical generators such as electric cells or accumulators together, or to form a current output therefrom, a metal strip which is assembled therewith by electric welding is frequently used.

More often than not, this weld is effected by laying one end of the strip against a suitable metal part of the generator and by making the two electrodes of the welding apparatus bear on the said end of the strip.

Applicant has observed that in such event the weld effected was not always a good-quality weld; more particularly, that quality varies as a function of the relative thicknesses of the strip to be welded and of the support receiving it. This is due to the fact that a part of the weld current generated by the welding apparatus, flowing only through the thickness of the strip as a stray current is not used for welding.

It is therefore, desirable for implementing this method that the thickness of the metal portion of the generator onto which the strip is welded be greater than the thickness of the said strip.

In order to avoid that interference or stray current flow of the weld current only inside the strip to be welded, the weld could be effected by applying one welding electrode onto the strip to be welded and the other onto the metal part of the generator, in the proximity of the region of the strip to be welded.

This latter method, however, has the disadvantage of causing an alteration of the portion of the generator which directly supports the weld electrode applied thereto during welding.

Moreover, according to the latter method, only one weld point is formed bewteen the strip and the portion of the generator onto which it is applied, and it has been observed that it was difficult to form, subsequently, a second weld point, the welding current then flowing completely through the first weld point. This is a great disadvantage, for the use of high currents makes it compulsory to use connecting strips having a great width and a plurality of weld points.

The present invention, more particularly, enables overcoming of these disadvantages.

It has for its object a method for effecting electrical connection by electric welding, characterized in that at least the portion of the connection means to be welded to a part is in the shape of two strips which are substantially parallel and preferably close together, each of the two electrodes of the welding apparatus being applied, during welding, respectively on one of said strips.

The existence of discontinuity between the portions of the connection means on which the two welding electrodes bear has the effect of avoiding the existence of a detrimental interference or stray current, and thus enables good welds to be obtained.

According to a particular embodiment, the said connection means comprises two distinct strips or blades arranged parallel to each other without touching.

According to another embodiment, and with the aim during the welding operation of ensuring more easily the relative positioning of the two blades or strips, the said connection means takes the form of two substantially parallel metal strips, connected together by a common central portion remote from the locations at which welding is to be effected.

Other objects and features of the invention will become apparent from the following detailed description and the accompanying drawing, in which:

FIG. 5 is analogous to FIG. 1, with a connection means formed by two blades connected by a common central portion.

DETAILED DESCRIPTION

Figure 1:
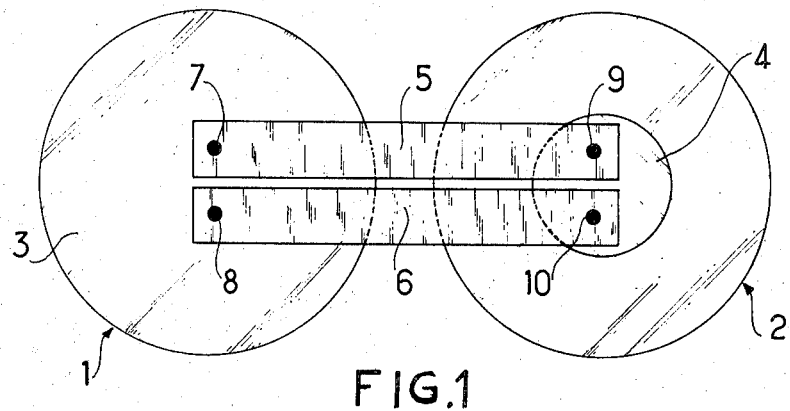
FIG. 1 is a top view of two cylindrical generators electrically connected according to the present invention by two parallel blades.

In FIG. 1, the references 1 and 2 designate two cylindrical electrochemical generators, for example, accumulators or storage cells. In the example shown, these accumulators must be electrically connected together in series by connecting the metallic bottom 3 of the generator 1 with the opposite polarity metal cap 4 of the generator 2.

The connection means used is in the form of two metallic strips or blades 5 and 6, each comprised, for example, of a nickel steel band, arranged substantially parallel to and at a slight distance from each other, and which are welded by applying the two electrodes of the welding apparatus respectively to the adjacent ends, that is, at 7 and 8, and at 9 and 10, producing effective welds respectively at 7 and 8 and at 9 and 10.

Figure 2:
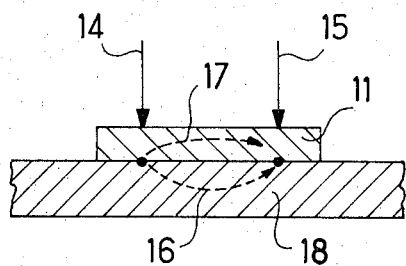
FIGS. 2, 3 and 4 show respectively two electric weld methods according to prior art, mentioned in the preceding text and the method according to the invention.
Figure 3:
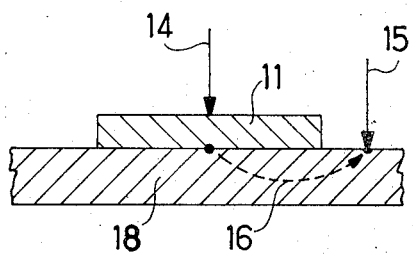
Figure 4:
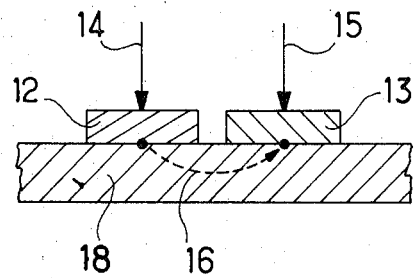

The advantages resulting from practicing the method according to the invention appear clearly by reference to FIGS. 2, 3 and 4.

In these figures, the reference 18 designates the metal portion of the generator onto which the connection means is welded.

In the case of FIGS. 2 and 3, this connection means is in the form of a single strip 11, whereas in the case of FIG. 4, which corresponds to the practice of the method according to the invention, the portion of the connection means to be welded comprises two parallel strips 12 and 13.

The arrows 14 and 15 symbolize the two electrodes of the welding apparatus.

The current actually used and serving for welding is designated by the arrow 16.

The arrow 17 in FIG. 2 designates the interference or stray current which is generated in the strip 11 on application of the welding electrodes. It does not exist in the case either of FIG. 3 or 4. Nevertheless, in the case of FIG. 3, the part 18 undergoes an undesirable alteration at the point onto which the welding electrode 15 is applied.

The method according to the invention as illustrated in FIGS. 1 and 4 enables excellent welds to be made even when the thickness of the part 18 is smaller than that of the connection means, the respective thicknesses of these elements being, for example 0.2 and 0.5 mm., contrary to the result obtained by utilizing the method according to FIG. 2.

The invention applies also to the case where only the portion of the connection means to be welded is in the form of two strips or blades, these two strips then being connected together by a common part, as shown in FIG. 5. In that example, the elements already described and shown in FIG. 1 bear the same references. The connection means 20 used is in the form of two metal strips 21 and 22 arranged substantially parallel and relatively close to each other and connected together by a common central portion 23. They are welded by applying the two electrodes of the welding apparatus to two adjacent ends, namely at 7 and 8 and at 9 and 10.

The advantages set forth previously as regards FIGS. 1 and 4 subsist despite the existence of the portion 23 electrically connecting the parts 21 and 22 of the connection means. Indeed, the interference or stray current symbolized by the arrow 24 which could be set up, will be negligible due to the distance it has to travel, which provides a sufficiently high resistance, respectively between two adjacent ends 7 and 8, or 9 and 10.

On the other hand, an extra advantage is apparent: the ease with which the connection means is positioned and held in place during welding.

Such connection means are more particularly used for providing current outputs.

The method according to the invention is applicable equally as well, whether the connection means are substantially plane or curved.

Thus, according to the invention, it is possible to connect accumulators of the disk type electrically together, by means of connection means in the form of two parallel strips curved and welded at their ends onto the said accumulators.

It should also be mentioned that, since the connection means being welded to the generator comprises two strips or blades this constitutes a safety factor due to the fact that if one strip becomes unwelded, the second strip still remains welded.

Lastly, it should be observed that the method according to the invention can easily be implemented for industrial purposes.

The present invention also has for its object an electrochemical generator provided with at least one connection means such as described and applied by the method of this invention.

It is to be understood that variation in detail within the scope of the appended claims are possible and are contemplated. There is no intention, therefore, of limitation to the exact disclosure hereinabove presented.

What is claimed is:

1. An electrochemical battery comprising at least two electrochemical generators, output terminals for each generator, and connection means for electrically connecting one terminal of one generator to one terminal of the other generator, said connecting means comprising two substantially parallel strips closely disposed relative to each other and both welded to said one terminal of said first-named generator and also to said one terminal of said other generator.

2. An electrochemical battery according to claim 1, said strips being joined together in a region remote from the regions where they are welded to said generators.

References Cited

UNITED STATES PATENTS

| 3,427,202 | 2/1969 | Wilke | 136—175 |
| 3,615,867 | 10/1971 | Cich et al. | 136—175 |
| 1,651,726 | 12/1927 | Osterman | 136—128 |

FOREIGN PATENTS

| 157,097 | 10/1921 | Great Britain | 136—128 |

DONALD L. WALTON, Primary Examiner

U.S. Cl. X.R.

219—117